O. F. WOODWARD.
Nest-Egg.
No. 211,363.   Patented Jan. 14, 1879.
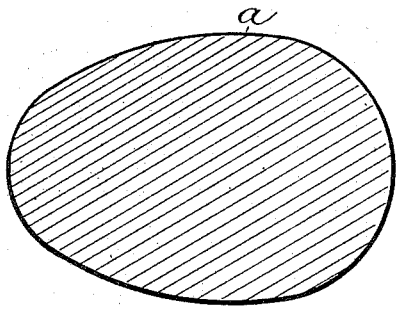
Attest.
John C. Burns,
R. E. White
Inventor.
Orator F. Woodward,
pr R. F. Osgood,
Atty.

UNITED STATES PATENT OFFICE.

ORATOR F. WOODWARD, OF LE ROY, NEW YORK.

IMPROVEMENT IN NEST-EGGS.

Specification forming part of Letters Patent No. 211,363, dated January 14, 1879; application filed April 1, 1878.

*To all whom it may concern:*

Be it known that I, ORATOR F. WOODWARD, of Le Roy, in the county of Genesee and State of New York, have invented a certain new and useful Improvement in Nest-Eggs; and I do hereby declare that the following is a full, clear, and exact description of the same, reference being had to the accompanying drawing, which represents a section of the egg.

My improvement relates to artificial eggs composed of a substance which is offensive to insects, the object being to render the same effective, not only as a nest-egg, but also as a destroyer of vermin.

The invention consists of a nest-egg composed of sulphur or brimstone, plaster or lime, carbolic acid, and glue, as hereinafter more fully described.

In the drawing, *a* represents the egg.

In compounding the mixture, I take a suitable quantity of brimstone or sulphur and melt the same. I add to this material a quantity of gypsum or lime, glue, and carbolic acid. The proportions may be varied, as desired; but I prefer about two parts of the sulphur or brimstone, one part of the gypsum or lime, simply enough of the glue to bind the elements together, and sufficient of the carbolic acid to impart its odor to the mass. These parts are all mixed thoroughly, and while in the plastic state are cast in molds of the size and form of the egg.

The brimstone or sulphur, which forms the main body of the compound, is extremely offensive to insects, as the odors are raised by the animal heat, and the carbolic acid also adds to these offensive qualities, while it is also a disinfectant. The material will therefore drive insects from the nest or the feathers of the fowl setting thereon, and will also purify the parts with which it comes in contact. The gypsum or lime gives a certain degree of porousness to the egg, so that the odors can readily escape, and being white it imparts the desired color. The glue, which is used only in very small quantity, unites the parts, gives strength and elasticity, and obviates the brittleness which would otherwise occur. The egg thus formed is solid throughout, having no inclosed liquid, and is almost indestructible.

I am aware that a hollow egg with a porous shell or stopper, and filled with an offensive material, has been known. Such I do not claim.

I claim—

An artificial egg consisting of a compound of brimstone or sulphur, plaster or lime, carbolic acid, and glue, cast in molds, as and for the purpose specified.

In witness whereof I have hereunto signed my name in the presence of two subscribing witnesses.

ORATOR F. WOODWARD.

Witnesses:
R. F. OSGOOD,
JACOB SPAHN.